Sept. 17, 1957     L. R. STRASTER     2,806,670
BASE FOR ROAD SIGNAL
Filed July 12, 1954                                           2 Sheets-Sheet 1
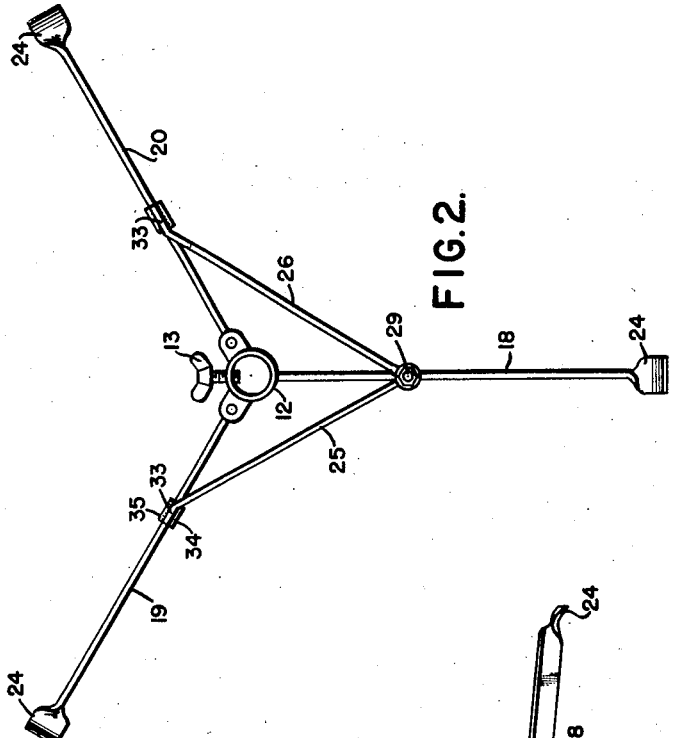
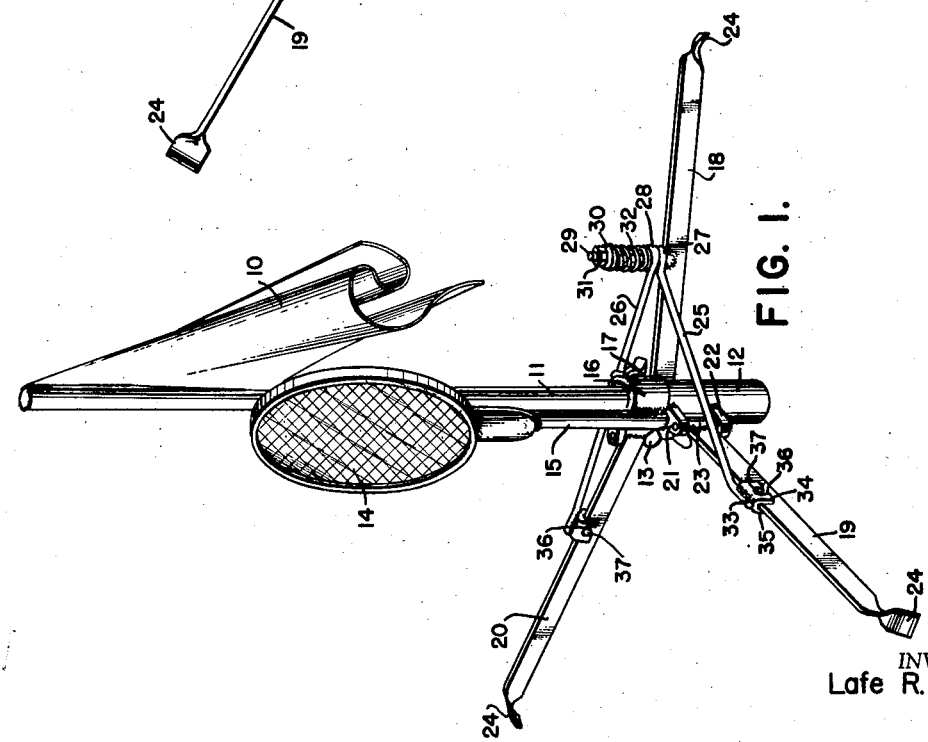
INVENTOR
Lafe R. Straster
BY *Wilkinson & Mawhinney*
ATTORNEYS Sept. 17, 1957 L. R. STRASTER 2,806,670
BASE FOR ROAD SIGNAL
Filed July 12, 1954 2 Sheets-Sheet 2
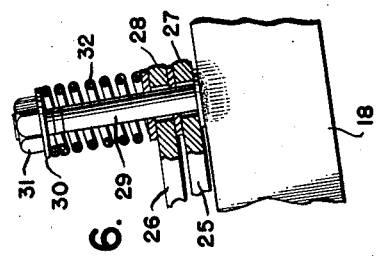
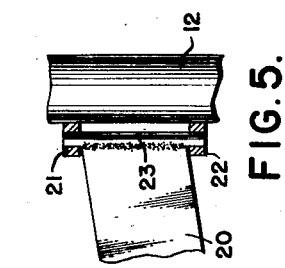
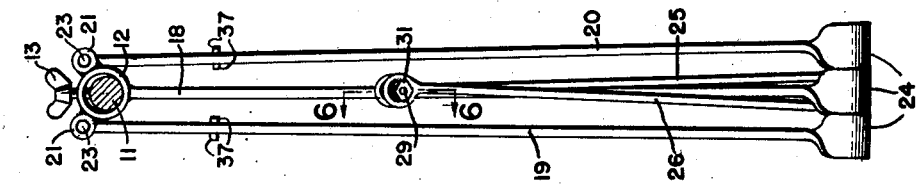
INVENTOR
Lafe R. Straster
BY Wilkinson + Mawhinney
ATTORNEY United States Patent Office 2,806,670
Patented Sept. 17, 1957

2,806,670

BASE FOR ROAD SIGNAL

Lafe R. Straster, Minot, N. Dak.

Application July 12, 1954, Serial No. 442,749

5 Claims. (Cl. 248—167)

The present invention relates to base for road signal and more particularly to a signal of general application which may be set upon a road to warn traffic of impending danger.

One particular use of the invention may be in connection with stalled trucks which are now commonly required by law to set flares along the road both in advance and in rear of the truck to advise oncoming vehicles in opposite direction of the presence of the truck which often has become stalled on one of the lanes or partially on one lane requiring the diversion of traffic around the stalled truck in such way that it interferes with traffic coming in opposite directions and the flares or signals advise the dangerous conditions existing so that vehicles may be slowed down and brought under control to obviate head-on collisions which might otherwise occur incident to the requirement for the use of a single lane for the traffic in opposite directions.

The road signal of the invention aims to provide visual signals which may be easily observed both in the day time and at night involving, in the specific embodiment of the invention illustrated in the drawings, a red warning flag and a red reflecting prismatic disc for intercepting the headlights of an oncoming automobile and reflecting back a red danger signal.

Another object of the present invention is to provide a road signal having a wide base for purchase over a relatively large area of the roadway for resisting tipping or turning over of the signal as by the suction created by the rapid movement of automobiles in proximity to the same.

Another object of the invention is to provide a collapsible road signal which may be stored in very small space in the truck or other vehicle or which is readily portable by hand as by road construction crews.

The invention also contemplates a tripod or other collapsible base construction for the support of road signals or other devices in which an improved latching device is involved for maintaining the collapsible legs of the base support in an extended position.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a perspective view of a road signal constructed in accordance with the present invention and in the set-up position of use.

Figure 2 is a top plan view of the base in the extended or set-up position with the reflector and flag removed.

Figure 3 is a side elevational view of the same with parts broken away and parts shown in section, with the reflector in place and the flag removed.

Figure 4 is a top plan view of the road signal in the collapsed position and with the flag staff shown as inserted in cross-section in the socket of the base.

Figure 5 is a fragmentary side elevational view showing a form of pivotal mounting of a leg upon the central socket and Figure 6 is a vertical sectional view taken on an enlarged scale on the line 6—6 of Figure 4.

Referring more particularly to the drawings, 10 designates a red warning flag carried by a flag staff 11 adapted to be supported in a tubular socket 12 of the base member, in which it may be held by a wing set screw 13 or the like.

A red prismatic reflector 14 is carried upon a standard 15 having at its lower end a collar 16 of a diameter to fit about the tubular socket 12. A wing set screw 17 on the collar 16 is tightened against the outer wall of the socket 12 to hold the reflector in place.

The base member of the device which serves to support the flag and the reflector, may consist of a number of legs of which the embodiment shown in the drawing comprises three, namely a fixed leg 18, and two pivoted legs 19 and 20.

The fixed leg 18 is fixed in relation to the tubular socket 12, it being welded or otherwise secured thereto. The two pivoted legs 19 and 20, which together with the fixed leg 18 constitute a tripod arrangement are hinged or pivotally mounted to the tubular member 12 as shown more particularly in Figure 5, in which 21 and 22 indicate bearings for receiving the pivot pin 23 which is welded or otherwise secured to the inner end of the pivoted leg 20. A similar arrangement is provided for the leg 19. The bearings 21 and 22 are affixed to, and project radially out from the tubular socket 12 at suitable angular distances apart. Where three such legs are employed the three legs will be angularly displaced from one another through approximately 120 degrees.

The outer ends of the legs terminate in feet 24. Where the legs are made from bar metal, such bars are arranged with edgewise dimensions in the vertical for purposes of strength. The feet may be formed by twisting free end portions of the bars through approximately 90 degrees and curving the same downwardly and outwardly so that the edges only of the bars contact the road supporting surface along line contacts.

Latch arms 25 and 26 have superposed eyes 27 and 28 at one end rotatably fitted about a bolt 29 which upstands from an intermediate portion of the fixed leg 18 and is secured thereto as by welding.

As more particularly seen in Figure 6 the upper portion of the bolt 29 is threaded to receive the washer 30 and nut 31 which are employed to confine the upper end of a coil spring 32 surrounding the bolt and bearing upon the washer 30 with tension adjusted by the nut 31. The lower end of the spring exerts elastic tension upon the eyes 28, 27.

The free ends of the latch arms 25, 26 carry bifurcated latch heads 33 having spaced dependent jaws 34, 35 adapted to straddle the pivoted legs 19, 20. In the jaws 34, 35 are intermediate notches 36 opening downwardly so as to be received over latch pins 37 projecting in opposite directions from the legs 19 and 20 at intermediate points thereof.

In the use of the device, the same may be carried in a truck in the collapsed position shown in Figure 4 in which the pivoted legs 19, 20 have been folded into substantially parallel relation along side the fixed leg 18 and the latch arms 25, 26 are folded substantially over the fixed leg 18, being held in this position by the elastic tension exerted thereon by the spring 32.

By loosening the set screw 13 the flag staff 11 is withdrawn from the socket 12 and subsequently by loosening the set screw 17 the collar 16 is lifted off the socket 12 and the reflector 14 stored with the flag along side the collapsed base of the device.

When the device is to be set up, the legs 19 and 20 are rotated about the respective pivot pins 23 until the same assume generally the position shown in Figures 1 and 2, whereupon the latch arms 25 and 26 are rotated about the bolt 29 against the frictional tension of their eyes 27, 28 under the expansive action of the spring 32. The lengths of the latch arms 25, 26 is such that the saddles or latch heads 33 will arrive at the interlocking position with the pin 37 when the several legs 18, 19 and 20 are in the relationship of 120 degrees apart, that is equidistantly spaced from one another. The eyes 27, 28 must be lifted slightly upwardly on the bolt 29 against the spring pressure 32 in order to enable the latch heads or saddles 32 to engage over the upper edges of the pivoted legs 19, 20. When the spaces between the jaws 34, 35 align with the pivoted legs 19, 20, the spring 32 will expand downwardly forcing the eyes 28, 27 and the latch arms 25, 26 downwardly so as to snap the latch heads 33 over the pivoted legs 19, 20 with the notches 36 being entered about the latch pins 37. The spring 32 will thereupon yieldingly maintain the latch heads in the latched position with respect to the pins 37. As the bolt 29 is fixedly attached to the fixed leg 18, the angular relationship of all of the legs will be preserved until such time as the operator forcibly lifts the latch arms 25, 26 against the spring action of the coil spring 32 to manually lift and disengage the latch heads from the pins 37 and from the pivoted legs 19, 20.

When the base is set up in the manner shown in Figures 1, 2 and 3, the reflector 14 and the flag 10 may be mounted in place as hereinbefore described.

It will be understood that the base may be employed to support other superposed structures. It will also be understood that the base comprising the legs 18, 19 and 20 and the latch arms 25, 26 and associated parts together with the tubular socket 12 constitute a relatively low construction which does not rise to any great height above the road surface, and by virtue thereof and because of the further fact that the feet 24 are spaced at great radial and circumferential distances apart, the base has a wide and stable purchase upon the road way so that it cannot tip or turn over. Such base possesses considerable strength for supporting several types of road signals or other devices.

It will also be appreciated that the device may be set up quickly when its use is required, and also may be demounted and folded in a very short space of time and into relatively small compass so that it may be carried about conveniently and stowed in small space. The latching device is such as to rigidly hold the parts in extended position and against casual or accidental collapse.

Although I have disclosed herein the best form of the invention known to me at this time, I reserve the right to all such modifications and changes as may come within the scope of the following claims.

I claim:

1. A base member for a road signal or the like comprising a central member, legs radiating from the central member, one of which at least is hinged to the central member to swing toward and from another of the legs, a latch member pivotally and slidably carried by one leg and having a part for interlocking with the other leg and means for slidably urging said part into latching relation with said other leg.

2. A base member for road signals or the like comprising a central member, legs radiating from the central member, one at least of which is mounted to swing about the central member toward another of such legs, a guide member carried by one of the last mentioned legs, a latch member swingably mounted about said guide member and also slidably movable thereon in a direction angular to the swinging movement, resilient means about said guide member bearing on said latch member to move the same in one direction of its slidable movement and to impose frictional resistance on the swinging movement thereof, a latch head carried by the free end portion of said latch member movable by a swinging movement of the latch member into potential position opposite to the other of the last mentioned legs and moved by said resilient means in a sliding movement into latching relation with the last mentioned leg.

3. A base member for road signals or the like comprising a central member, legs radiating from the central member, one at least of which is mounted to swing about the central member toward another of such legs, a guide member carried by one of the last mentioned legs, a latch member swingably mounted about said guide member and also slidably movable thereon in a direction angular to the swinging movement, resilient means about said guide member bearing on said latch member to move the same in one direction of its slidable movement and to impose frictional resistance on the swinging movement thereof, a latch head carried by the free end portion of said latch member movable by a swinging movement of the latch member into potential position opposite to the other of the last mentioned legs and moved by said resilient means in a sliding movement into latching relation with the last mentioned leg, and means on the last mentioned leg for further interlocking with said latch head to prevent slidable movement of the latch head on said last mentioned leg whereby to preserve a preselected angular distance between the two legs spanned by said latch member.

4. A base member for road signals or the like comprising a central member, legs radiating from the central member, one at least of which is mounted to swing about the central member toward another of such legs, a guide member carried by one of the last mentioned legs, a latch member swingably mounted about said guide member and also slidably movable thereon in a direction angular to the swinging movement, resilient means about said guide member bearing on said latch member to move the same in one direction of its slidable movement and to impose frictional resistance on the swinging movement thereof, a latch head carried by the free end portion of said latch member movable by a swinging movement of the latch member into potential position opposite to the other of the last mentioned legs and moved by said resilient means in a sliding movement into latching relation with the last mentioned leg, said latch head having a groove therein opening to one edge thereof, and a pin on the last mentioned leg at an intermediate point thereof in position to be received into the groove in said latch head for preventing the latch head from sliding radially on the last mentioned leg.

5. A base member for a road signal or the like comprising a central member, legs radiating from the central member, one of which at least is hinged to the central member to swing toward and from another of the legs, latching means for maintaining the angular distance between the legs comprising a pin on one of said legs, a latching member connected at one end thereof to the other of said legs for sliding movement in a direction angular to the swinging movement of the hinged leg, a latch head on the free end of said latching member having a groove therein opening through one edge thereof, the length of the latching member being such that said groove will register with said pin when the legs are approximately 120 degrees apart, and resilient means for sliding said latching member in a direction to cause the groove to engage over the pin.

References Cited in the file of this patent

UNITED STATES PATENTS

| 1,403,865 | Pritchett | Jan. 17, 1922 |
|---|---|---|
| 1,508,470 | Partmann | Sept. 16, 1924 |
| 1,862,644 | Wieneke | June 14, 1932 |
| 1,871,667 | Dalton | Aug. 16, 1932 |
| 2,160,426 | Archer | May 30, 1939 |
| 2,248,273 | Krajnc | July 8, 1941 |
| 2,451,875 | Ryder | Oct. 19, 1948 |
| 2,631,802 | Tunis | Mar. 17, 1953 |